United States Patent
Aslanova et al.

[15] 3,639,113
[45] Feb. 1, 1972

[54] METHOD OF MANUFACTURING TAPE POSSESSING SEMICONDUCTING PROPERTIES

[72] Inventors: Margarita Semenovna Aslanova, Karmanitsky per. 10, kv. 3; Maria Alexandrovna Yakovleva, 3 Parkovaya ulitsa, 48, kv. 47, both of Moscow, U.S.S.R.

[22] Filed: Jan. 31, 1969

[21] Appl. No.: 795,689

Related U.S. Application Data

[63] Continuation-in-part of Ser. No. 475,252, July 27, 1965, abandoned.

[52] U.S. Cl. ............................................. 65/30, 65/3, 65/4, 65/9, 65/32, 65/33, 65/60, 65/111, 65/134, 117/124, 117/229
[51] Int. Cl. ............... C03c 15/00, C03b 29/00, C03c 23/20
[58] Field of Search ............... 65/33, 32, 3, 4, 111, 9, 134, 65/30, 60; 117/124, 229

[56] References Cited

UNITED STATES PATENTS

| | | | |
|---|---|---|---|
| 2,526,870 | 10/1950 | Jelinek et al. | 65/33 X |
| 2,704,734 | 3/1955 | Draper et al. | 65/4 X |
| 2,946,371 | 7/1960 | Stephens et al. | 65/4 X |
| 3,220,915 | 8/1965 | Shannon | 65/33 X |
| 3,146,114 | 8/1964 | Killigan | 65/33 |
| 3,231,456 | 1/1966 | McMillan et al. | 65/33 X |
| 3,282,711 | 11/1966 | Lin | 65/33 X |
| 3,420,645 | 1/1969 | Hair | 65/22 X |
| 3,464,806 | 9/1969 | Seki et al. | 65/33 X |
| 3,490,887 | 1/1970 | Herczug et al. | 65/33 |
| 3,508,894 | 4/1970 | Torok | 65/32 X |

FOREIGN PATENTS OR APPLICATIONS

| | | | |
|---|---|---|---|
| 944,571 | 12/1963 | Great Britain | 65/33 |

*Primary Examiner*—Frank W. Miga
*Attorney*—Waters, Roditi, Schwartz & Nissen

[57] ABSTRACT

A method of producing a fiberglass tape with semi-conducting properties, according to which from a glass melt comprising 40 to 60 weight percent of $SiO_2$, 5 to 16 weight percent of $Al_2O_3$, 15 to 40 weight percent of CuO, 0 to 16 weight percent of CaO, 0 to 10 weight percent of MgO, 0 to 2 weight percent of NaO, and 0 to 10 weight percent of $B_2O_3$ glass fibers are obtained, from which a fiberglass tape is produced which is subjected to heat treatment in a reducing medium at 100 to 800°C.

5 Claims, No Drawings

METHOD OF MANUFACTURING TAPE POSSESSING SEMICONDUCTING PROPERTIES

OTHER APPLICATION

This application is a continuation-in-part of our earlier application Ser. No. 475,251 filed July 27, 1965 and now abandoned.

DETAILED DESCRIPTION

The present invention relates to methods of producing insulation materials for electrical machines. More particularly, the present invention relates to a method of producing a fiber glass tape with semiconducting properties to be employed in corona protection of high-voltage windings of electrical machines.

Known in the art is a method of producing a fiberglass tape, according to which fiber is drawn from a glass melt comprising 54 weight percent of $SiO_2$, 15.5 weight percent of $Al_2O_3+TiO_2+Fe_2O_3$, 16.0 weight percent of CaO, 4.0 weight percent of MgO, 10.0 weight percent of $B_2O_3$, and 0.5 weight percent of $Na_2O$. This fiber is woven into a tape on looms, and then the tape is impregnated with semiconducting varnishes with additions of soot to impart semiconducting properties to the tape.

Such a band, when employed in electrical machines, fails to insure sufficient balancing of the electric field due to the instability of the electric resistance throughout the tape length. The instability of the electric resistance is associated, on the one hand, with an uneven distribution of soot in the varnish, and, on the other hand, with powdering and destruction of the current-conducting film in the course of the tape service.

Also known in the art are glass compositions disclosed in U.S. Pat. Nos. 3,231,456 and 3,282,711 which include CuO in an amount not over 15 weight percent. Such glass compositions, however, cannot be used for producing a fiberglass tape with semiconducting properties.

It is an object of the present invention to provide a method of producing a fiberglass tape with semiconducting properties and having an electric resistance stable throughout the length thereof.

Said and other objects are attained due to the fact, that in the present method of producing a tape with semiconducting properties, wherein fibers are produced from a glass melt comprising 40 to 60 weight percent of $SiO_2$, 5 to 16 percent of $Al_2O_3$, 0 to 16 weight percent of CaO, 0 to 10 weight percent of MgO, 0 to 2 weight percent of $Na_2O$, 0 to 10 weight percent of $B_2O_3$ and 15 to 40 weight percent of CuO, by drawing through a spinning nozzle with cooling of the zone below the nozzle exit, manufacturing a tape from the fibers thus obtained, heating the tape in a reducing medium at 100 to 800° C. for a period of time sufficient for copper ions to migrate into the surface layer of the fiber glass and to interact with the reducing medium, whereby the tape acquires semiconducting properties.

A semiconducting layer is formed on each separate fiber due to the fact, that copper, which is in the ionic state, becomes mobile when heated, and the gaseous reducing medium, for instance, hydrogen, diffuses into the glass.

In the surface layer metallic copper, cuprous oxide and hydrogenated glass are thus formed, the latter decomposing at high temperatures with the evolution of water.

This results in the appearance of a semiconducting layer with a microcrystalline structure in the surface layer of the fibers, the thickness of this semiconducting layer depending on the temperature to which the tape is heated and the period of time it is kept in the reducing medium.

It is expedient, that at least one of the following additives be present in the glass melt in an amount of 0.1 to 5 weight percent $Li_2O$, $TiO_2$, $Ag_2O$, ZnO, BaO, CdO, $ZrO_2$, $Fe_2O_3$.

The results prove to be most favorable, when the glass melt composition is as follows (the amount of the constituents being indicated in weight percent): $SiO_2$, 44; $Al_2O_3$, 12; CaO + MgO, 10.0; CuO, 21.0; $Na_2O$, 2.0; $B_2O_3$, 10.0; and $Ag_2O$, 1.01. The following composition (in weight percent) can also be recommended: $SiO_2$, 44.0; $Al_2O_3$, 14.0; CaO + MgO, 10.0; CuO, 24.0; $Na_2O$, 2.0; and $B_2O_3$, 6.0.

$SiO_2$ is the basic component of the fiber glass tape. If the amount of $SiO_2$ in the glass exceeds 60 weight percent, the process of migration and reduction of copper ions in the surface layer is hindered. If the amount of $SiO_2$ is less than 40 weight percent, this will adversely affect the process of producing the fibers.

$Al_2O_3$ insures the required viscosity and crystallization properties of the glass which are of special importance for producing the fibers.

CuO imparts semiconducting properties to the fiber glass. Should the amount of CuO in the glass be less than 15 weight percent, it will become impossible to insure semiconducting properties of the fiber glass tape; should it be greater than 40 weight percent, the glass will be more liable to crystallization, which makes the production of fibers more difficult.

The introduction of CaO, MgO, $Na_2O$, and $B_2O_3$ either separately or in combination decreases the liability of glass to crystallization and makes it possible to reduce the temperature for melting the glass, thereby facilitating the manufacture of the glass fibers.

Such additions as $Li_2O$, $TiO_2$, $Ag_2O$, ZnO, BaO, CdO, $ZrO_2$, $Fe_2O_3$ insure the stability of the electric resistance of the fiber glass tape under high-temperature service conditions.

The present invention will now be described in detail by way of exemplary embodiments of the method of producing a fiber glass tape having semiconducting properties.

A charge is prepared, comprising 44 weight percent of $SiO_2$, 14 weight percent of $Al_2O_3$, 10 weight percent of CaO + MgO, 24.0 weight percent of CuO, 2.0 weight percent of $Na_2O_3$, and 6.0 weight percent of $B_2O_3$ the raw materials being sand, dolomite, alumina, boric acid, cupric oxide, sodium, and carbon dioxide. The charge is thoroughly mixed and in small portions delivered into a pot furnace maintained at 1,380° C. After the charge delivery has been completed, the furnace temperature is increased to 1,400° C., and the melting of glass is carried out at this temperature for about 20 hours. Then the temperature in the pot furnace is raised to 1,420° C. and the glass melt is fined during 1.5 to 2 hours until a homogeneous glass melt is obtained, which is then cooled by reducing the temperature in the furnace to 1,150° C. within 1 hour. After that the glass melt is ready for further processing.

The following composition of the charge can also be recommended: 44 weight percent of $SiO_2$, 12 weight percent of $Al_2O_3$, 10 weight percent of CaO + MgO, 21 weight percent of CuO, 2 weight percent of $Na_2O$, 10 weight percent of $B_2O_3$, and up to 1.0, but no less than 0.5 weight percent of $Ag_2O$. With such a composition the conditions of the glass melting and fining procedures are similar to those described hereinabove, a good stability of the electrical resistance of the tape being insured under high temperature service conditions.

The glass melt for producing a fiber glass tape with semiconducting properties can also be obtained from glass of the following composition: 50 weight percent of $SiO_2$, 15.0 weight percent of $Al_2O_3$, 35 weight percent of CuO. With such a composition of the charge, however, the furnace should be loaded at a temperature of 1,450° C, the glass melting procedure should be carried out at 1,500, and fining, at 1,520° C., respectively. From the ready glass melt glass beads are produced about 20 mm. in diameter. To preclude sharp cooling and cracking of the beads, they are placed onto mats made of glass wool. The beads are charged into a glass melting vessel with spinning nozzle openings, and melted. The beads are charged continuously as the fibers are being produced.

Under the effect of the hydrostatic head the glass melt emerges dropwise from the spinning nozzle openings of the vessel. The drops are taken off by means of a glass rod, and the fibers thus obtained are fed into a thread collector, where the fibers are treated with a sizing agent and connected into a thread which is wound onto a bobbin. Moulding of fibers in the spinning nozzle should be effected with cooling the zone under the spinning nozzle, to preclude excessive wetting of the spinning nozzle plate with the copper-containing glass.

The threads thus obtained are woven on conventional looms into a tape which, with a view to imparting semiconducting properties thereto, is subjected to heat treatment in a reducing medium, hydrogen, carbon monoxide and other gases being applicable for the purpose. Then the tape may be heat treated in an electric furnace, whereto the tape may be fed either continuously, or periodically in reels. If the tape treatment is effected in a continuous manner, the tape wound onto a reel is placed into a receiver (a box) that is mounted at one side of the furnace. The free end of the tape is drawn through the reducing chamber of the furnace with the help of drawing rolls and then wound onto a second reel which is located in the same receiver. Then hydrogen is supplied into the furnace and heating is started. When the temperature in the furnace chamber reaches a required value, the fiber glass tape is rewound.

As has been pointed out above, copper which in the fiber glass tape is in the ionic state, becomes movable with heating, and hydrogen diffuses into the glass. As a result, metallic copper and hydrogen glass are formed in the surface layer, the decomposition of the hydrogenated glass yielding cuprous oxide and being accompanied by the evolution of water. The depth of the diffusion of hydrogen and the amount of copper on the glass surface depend on the temperature of the reducing medium and the rate of the tape travel.

We have established, that with the temperature of the heat treatment varying within 100° to 800° C., a fiber glass can be obtained whose electrical resistance will be $10^2$ to $10^{12}$ as measured per square centimeter in the cross section of the tape for one centimeter of length thereof.

In order to check the electrical resistance of the fiber glass tape, a portion of the tape is clamped between two plane-parallel electrodes connected to a megohmmeter.

Given in the table below are glass compositions and the electrical resistance values of the fiberglass tape produced therefrom under specified heat treatment conditions.

The herein proposed method of producing fiber glass tape with semiconducting properties insures the stability of the electric resistance of said tape under high temperature conditions, since the semiconducting properties of the tape are due to the surface structure thereof and not to the application of semiconducting coatings which are easy to destroy.

Moreover, the tape produced in accordance with the method of the present invention increases the dependability of high-voltage electrical machines and prolongs their service life.

What is claimed is:

1. A method of producing a fiber glass tape having semiconducting properties, said method comprising (1) forming a glass melt having the following composition by weight:

| | |
|---|---|
| $SiO_2$ | 40–60% |
| $Al_2O_3$ | 5–16% |
| CuO | 15–40% |
| CaO | 0–16% |
| MgO | 0–10% |
| $Na_2O$ | 0–2% |
| $B_2O_3$ | 0–10% |

(2) spinning the melt into fibers; (3) weaving the fibers into a tape and (4) heating the tape in a reducing atmosphere at a temperature of 100° to 800° C. for a period of time sufficient to produce a specific electric resistance of $10^2$ to $10^{12}$ ohms as measured per square centimeter in the cross section of the tape and 1 cm. in length thereof.

2. A method as claimed in claim 1, wherein hydrogen is used as the reducing medium.

3. A method as claimed in claim 1, wherein the glass melt comprises in addition at least one of the following oxides taken in an amount of 0.1 to 5 weight percent: $Li_2O$, $TiO_2$, $Ag_2O$, ZnO, BaO, CdO, $ZrO_2$, $Fe_2O_3$.

4. A method as claimed in claim 3, according to which the glass melt comprises 44 weight percent of $SiO_2$, 12.0 weight percent of $Al_2O_3$, 10.0 weight percent of CaO + MgO, 21.0 weight percent of CuO, 2.0 weight percent of $Na_2O$, 10.0 weight percent of $B_2O_3$, and 1.0 weight percent of $Ag_2O$.

5. A method as claimed in claim 1, wherein the glass melt comprises 44.0 weight percent of $SiO_2$, 14 weight percent of $Al_2O_3$, 10.0 weight percent of CaO + MgO, 24 weight percent of CuO, 2.0 weight percent of $Na_2O$, and 6.0 weight percent of $B_2O_3$.

| Glass composition, weight percent | | | | | | | | | | | Fibreglass tape heat treatment temperature, °C. | Electric resistance, ohms |
|---|---|---|---|---|---|---|---|---|---|---|---|---|
| $SiO_2$ | $Al_2O_3$ | CaO | MgO | $B_2O_3$ | $LiO_2$ | $Na_2O$ | $TiO_2$ | $Fe_2O_3$ | CuO | $Ag_2O$ | | |
| 40.10 | 10.10 | | | 10.10 | | | | | 40.00 | | 100 | $10^2$ |
| 46.61 | 15.70 | | | | | | | | 36.80 | | 200 | $10^2$ |
| 46.1 | 16.0 | 5.6 | 3.0 | 58.5 | 1.88 | | 0.26 | | 24.0 | | 625 | $10^2$ |
| 45.01 | 15.80 | 6.70 | 2.85 | 6.01 | 2.06 | | 0.25 | 0.46 | 16.6 | 5.40 | 450 | $10^6$ |
| 52.08 | 10.25 | 5.91 | 4.09 | 5.71 | 1.82 | | 0.28 | 0.21 | 21.0 | 0.98 | 550 | $10^5$ |
| 51.20 | 15.52 | 9.51 | 3.40 | | | 2.10 | 0.15 | 0.31 | 16.03 | | 750 | $10^4$ |
| 60.80 | 4.80 | 16.40 | 4.40 | | | | | | 15.40 | | 800 | $10^4$ |

* * * * *